M. G. HOEFT.
RAIN AND WIND SIGNAL.
APPLICATION FILED MAR. 1, 1916.
1,213,642.
Patented Jan. 23, 1917.
2 SHEETS—SHEET 1.
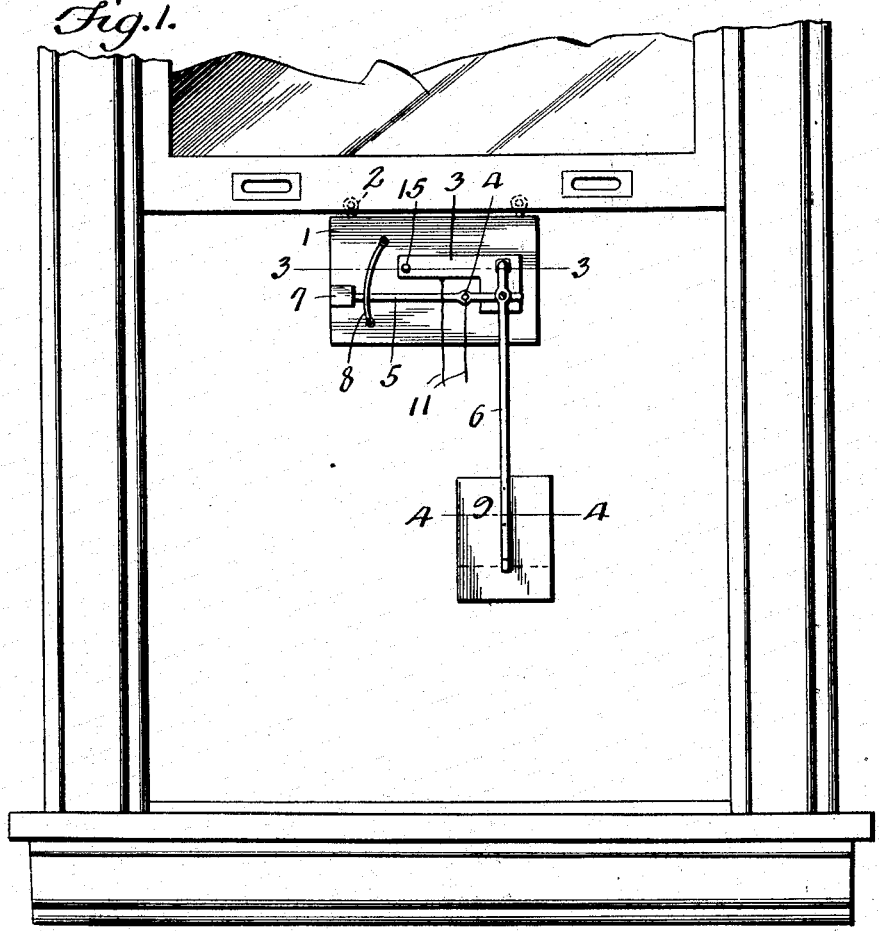
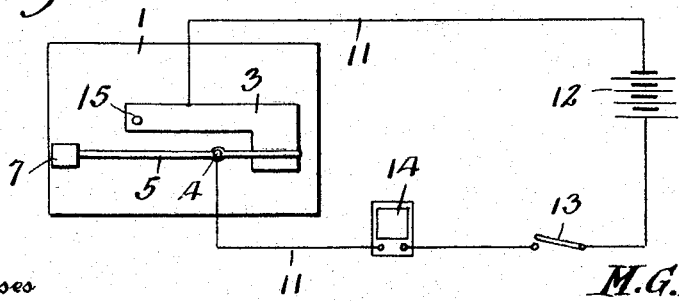

M. G. HOEFT.
RAIN AND WIND SIGNAL.
APPLICATION FILED MAR. 1, 1916.
1,213,642.
Patented Jan. 23, 1917.
2 SHEETS—SHEET 2.
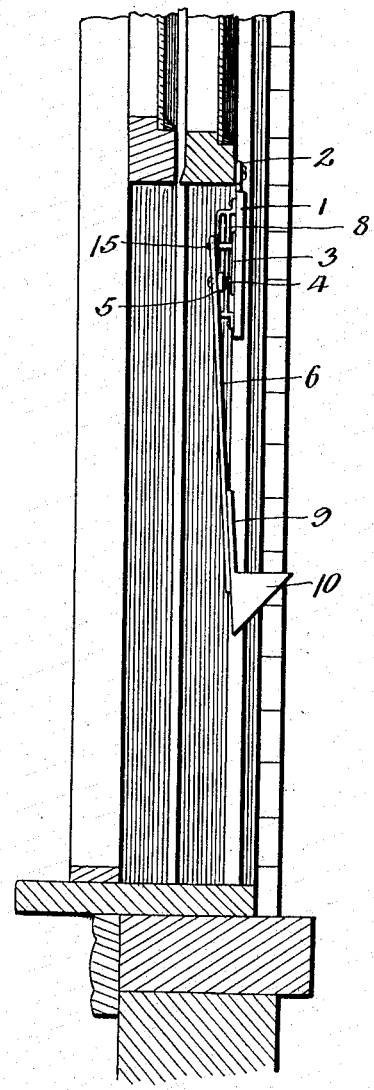
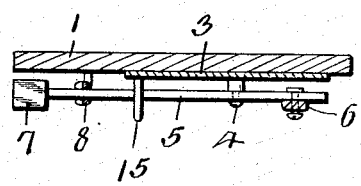
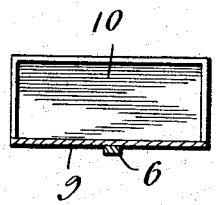
Witnesses
Inventor
M. G. Hoeft,
By Victor J. Evans
Attorney

UNITED STATES PATENT OFFICE.

MARTIN GEO. HOEFT, OF MINONK, ILLINOIS.

RAIN AND WIND SIGNAL.

1,213,642. Specification of Letters Patent. Patented Jan. 23, 1917.

Application filed March 1, 1916. Serial No. 81,536.

*To all whom it may concern:*

Be it known that I, MARTIN GEO. HOEFT, a citizen of the United States, residing at Minonk, in the county of Woodford and State of Illinois, have invented new and useful Improvements in Rain and Wind Signals, of which the following is a specification.

This invention relates to certain novel and useful improvements in signal devices for notifying the occupants of dwelling houses and other structures of rain and wind.

In carrying out the present invention, it is my purpose to provide a signal device of the class described which may be mounted in a window or other opening and which will notify the occupants of the dwelling house or other structure in the event of rain or wind so that the window or other opening may be closed.

It is also my purpose to provide a rain and wind signal which will embrace the desired features of simplicity, efficiency and durability, which will operate effectively for its intended purpose and which will embody comparatively few parts and these so arranged and correlated as to reduce the possibility of derangement to a minimum.

With the above and other objects in view, the invention consists in the construction, combination and arrangement of parts hereinafter set forth in and falling within the scope of the claim.

In the accompanying drawings; Figure 1 is a view in front elevation of a rain and wind signal constructed in accordance with the present invention. Fig. 2 is a view in edge elevation of the signal device supported by the window frame, the frame being shown in vertical section. Fig. 3 is a horizontal sectional view on the line 3—3 of Fig. 1. Fig. 4 is a sectional view on the line 4—4 of Fig. 1. Fig. 5 is a diagrammatic view showing the circuit connections.

Referring now to the drawings in detail, 1 designates a base having one edge thereof provided with eyes 2 whereby the base may be hung from a window frame or other support. Suitably fastened to one side of the base 1 is a substantially L-shaped contact plate 3. In the present instance, the contact plate 3 has a short vertical leg arranged adjacent to one edge of the baseboard and a relatively long horizontal leg projecting toward the other edge of the baseboard. Secured to the baseboard and below the horizontal leg of the contact plate and projecting outwardly from the baseboard is a pivot bolt 4 and fulcrumed between its ends upon the outer extremity of the pivot bolt is a lever 5. Loosely connected to one end of the lever 5 and depending therefrom is a supporting rod 6, while fastened to the other end of the lever 5 is a counterbalance weight 7. Fastened to the baseboard 1 is a vertical guide rod 8 offset from the baseboard and formed with a slot through which the lever 5 is passed. Secured to the lower end of the supporting rod 6 is a flat plate 9 and mounted upon the lower end of the plate 9 is a receptacle 10.

11 designates an electric circuit including a suitable source of electrical energy as a battery 12, a switch 13 and a signal 14. The terminals of the circuit 11 are connected to the pivot bolt 4 and the contact plate 3 respectively.

Connected to the horizontal leg of the L-shaped contact plate 3 at a point remote from the vertical leg and projecting outwardly therefrom is a contact pin 15 disposed in the path of movement of the lever 5. The upper end of the rod 6 projects above the lever 5 as clearly illustrated in Fig. 1 of the drawings so that such end of the rod may engage the plate 5 when the rod swings about its pivotal connection with the lever.

In practice, the baseboard carrying the contact plate, the lever, the supporting rod 6, the plate 9, and the receptacle 10 is hung from a window frame or other support and in the event of a precipitation of rain or snow the receptacle 10 will be filled and the lever 5 swung under the weight carried by the receptacle. In the downward movement of the receptacle, the weighted end of the lever 5 moves upwardly and engages the contact pin 15 carried by the plate 3, thereby closing the circuit to energize the signal 14. In the event of wind, the wind pressure is exerted upon the plate 9 with the effect to swing the rod 6 about its loose connection with the lever 5 in a direction at right angles to the base plate and in the swinging of the rod 6 the upper end thereof contacts with the plate 3, thereby closing the circuit.

While I have herein shown and described one preferred form of my invention by way of illustration, I wish it to be understood that I do not limit or confine myself to the precise details of construction herein described and delineated, as modification and variation may be made within the scope of the claim and without departing from the spirit of the invention.

I claim:

A signal device of the class described comprising a base board adapted to be supported in an open window or the like, a horizontal lever fulcrumed between its ends on said base board, a connecting rod loosely connected to one end of said lever and depending therefrom, and having the upper end projecting above said lever, means on the lower end of said rod adapted to receive rain, snow, etc., whereby the rod will be lowered and said lever swung about its peripheral connection with said base board, a contact plate on said base board, a pin carried by said plate and disposed in the path of movement of said lever, said pin and lever forming the terminals of the signal circuit, and means on the lower end of said rod adapted to receive wind pressure, whereby the rod will be swung about its loose connection with said lever to engage the upper end of said plate to close the signal circuit independently of said lever and pin.

In testimony whereof I affix my signature in presence of two witnesses.

MARTIN GEO. HOEFT.

Witnesses:
JOHN C. DANFORTH,
J. A. MINGEN.

Copies of this patent may be obtained for five cents each, by addressing the "Commissioner of Patents, Washington, D. C."